(12) United States Patent
Szczesny et al.

(10) Patent No.: US 8,545,234 B2
(45) Date of Patent: Oct. 1, 2013

(54) ELECTRICAL CONNECTOR FOR A PLUGGABLE TRANSCEIVER MODULE

(75) Inventors: David Stanley Szczesny, Hershey, PA (US); Michael Eugene Shirk, Grantville, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/283,104

(22) Filed: Oct. 27, 2011

(65) Prior Publication Data

US 2013/0109202 A1    May 2, 2013

(51) Int. Cl.
*H01R 12/72* (2011.01)

(52) U.S. Cl.
USPC ............................................................ 439/62

(58) Field of Classification Search
USPC ................. 439/62, 79, 59, 55, 660, 638, 571, 439/567
See application file for complete search history.

(56) References Cited

U.S. PATENT DOCUMENTS

| 5,295,852 | A  | * | 3/1994  | Renn et al. ................... 439/328 |
| 5,743,751 | A  | * | 4/1998  | Davis et al. ..................... 439/79 |
| 5,954,521 | A  | * | 9/1999  | Yang ................................ 439/59 |
| 5,971,775 | A  | * | 10/1999 | Tor et al. ......................... 439/79 |
| 6,300,911 | B1 | * | 10/2001 | Murray et al. ................. 343/702 |
| 6,554,643 | B1 | * | 4/2003  | Whiting ......................... 439/571 |
| 7,101,188 | B1 | * | 9/2006  | Summers et al. ............... 439/59 |
| 7,232,345 | B2 | * | 6/2007  | Ishizuka et al. ............... 439/660 |
| 7,628,562 | B2 | * | 12/2009 | Annes ........................... 403/329 |
| 7,794,241 | B2 | * | 9/2010  | Bright et al. ..................... 439/79 |
| 7,918,668 | B1 | * | 4/2011  | MacDougall ................... 439/66 |
| 8,062,055 | B2 | * | 11/2011 | Myer et al. .................... 439/366 |
| 8,172,602 | B2 | * | 5/2012  | Patel et al. .................... 439/499 |
| 8,177,564 | B1 | * | 5/2012  | Ito et al. ........................ 439/108 |
| 8,287,306 | B2 | * | 10/2012 | Daugherty et al. ........ 439/540.1 |
| 2003/0171012 | A1 | * | 9/2003 | Korsunsky et al. ............. 439/79 |
| 2004/0038566 | A1 | * | 2/2004 | Shirai ............................ 439/79 |

* cited by examiner

*Primary Examiner* — Alexander Gilman

(57) ABSTRACT

A pluggable module includes a housing having a locating opening that is at least partially defined by a wall of the housing. A circuit board is at least partially disposed within the housing and includes an edge and a mating contact. An electrical connector is mounted to the circuit board and includes an electrical contact having a mounting segment that is configured to be electrically connected to the mating contact of the circuit board. The electrical connector includes a dielectric connector body that holds the electrical contact. The body has a base that is coupled to the edge of the circuit board and a locating boss that extends outwardly on the base. The locating boss is received within the locating opening of the housing and includes a crush rib that extends outwardly from the locating boss. The crush rib is deformed and engaged with the wall of the housing.

17 Claims, 7 Drawing Sheets

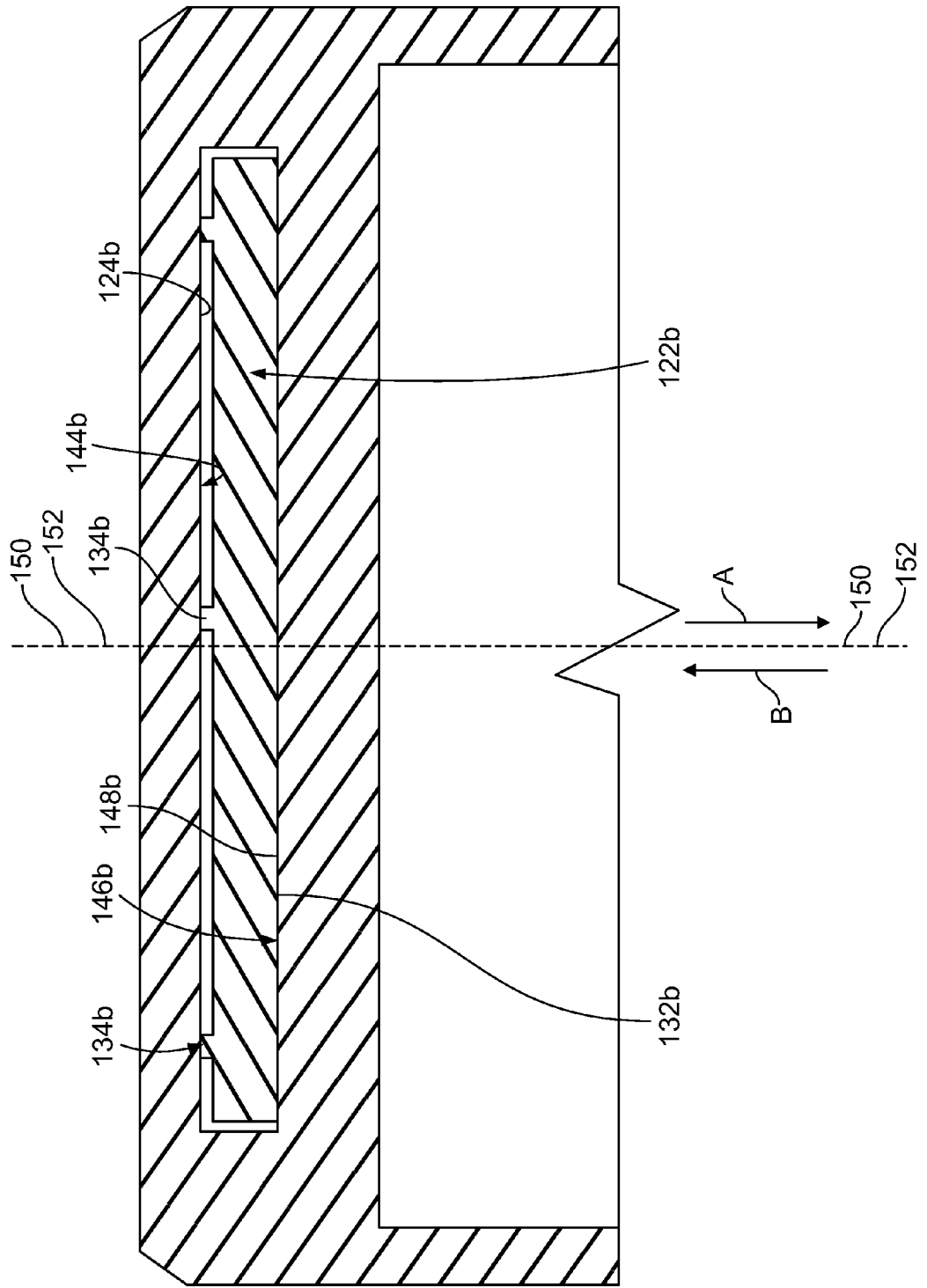

ELECTRICAL CONNECTOR FOR A PLUGGABLE TRANSCEIVER MODULE

BACKGROUND OF THE INVENTION

The subject matter described and/or illustrated herein relates generally to electrical connectors, and more particularly to electrical connectors for mounting to circuit boards of pluggable modules.

Various types of fiber optic and copper based transceiver assemblies that permit communication between host equipment and external devices are known. These transceiver assemblies typically include a pluggable module that is received within a receptacle assembly, which includes a receptacle connector that pluggably connects to the pluggable module. The pluggable modules are constructed according to various standards for size and compatibility, for example the Quad Small Form-factor Pluggable (QSFP) module standard and the XFP standard.

The receptacle connectors of transceiver assemblies include a receptacle for pluggably connecting to the pluggable module. A plug of the pluggable module is plugged into the receptacle along an insertion axis. The plug is sometimes an extension of a straddle mount connector that is mounted to the edge of the circuit board of the pluggable module. As the plug is plugged into the receptacle, electrical contacts of the receptacle connector mate with electrical contacts of the plug to establish an electrical connection between the pluggable module and the receptacle connector. However, as the plug is plugged into the receptacle, the straddle mount connector may move, or float, along the insertion axis relative to the pluggable module. Floating of the straddle mount connector along the insertion axis may cause an insufficient amount of contact wipe between the electrical contacts of the receptacle connector and the electrical contacts of the plug, which may cause an insufficient, an unreliable, or no electrical connection therebetween.

BRIEF DESCRIPTION OF THE INVENTION

In one embodiment, a pluggable module includes a housing having a locating opening. The locating opening is at least partially defined by a wall of the housing. A circuit board is at least partially disposed within the housing. The circuit board has an edge and a mating contact. An electrical connector is mounted to the circuit board. The electrical connector includes an electrical contact having a mounting segment that is configured to be electrically connected to the mating contact of the circuit board. The electrical connector also includes a dielectric connector body. The electrical contact is held by the body. The body has a base that is coupled to the edge of the circuit board. The body includes a locating boss that extends outwardly on the base. The locating boss is received within the locating opening of the housing. The locating boss includes a crush rib that extends outwardly from the locating boss. The crush rib is deformed and engaged with the wall of the housing.

In another embodiment, an electrical connector is provided for mounting to a circuit board of a pluggable module. The electrical connector includes an electrical contact having a mounting segment that is configured to be electrically connected to a mating contact of the circuit board. The electrical connector also includes a dielectric connector body. The electrical contact is held by the body. The body has a base that is configured to be coupled to an edge of the circuit board. The body includes a locating boss that extends outwardly on the base. The locating boss is configured to be received within a locating opening of a housing of the pluggable module. The locating boss includes a crush rib that extends outwardly from the locating boss. The crush rib is deformable such that the crush rib is configured to deform when engaged with the housing of the pluggable module.

BRIEF DESCRIPTION OF THE DRAWINGS

FIG. 7 is a cross-sectional view taken along line 7-7 of FIG. 6.

DETAILED DESCRIPTION OF THE INVENTION

Figure 1:
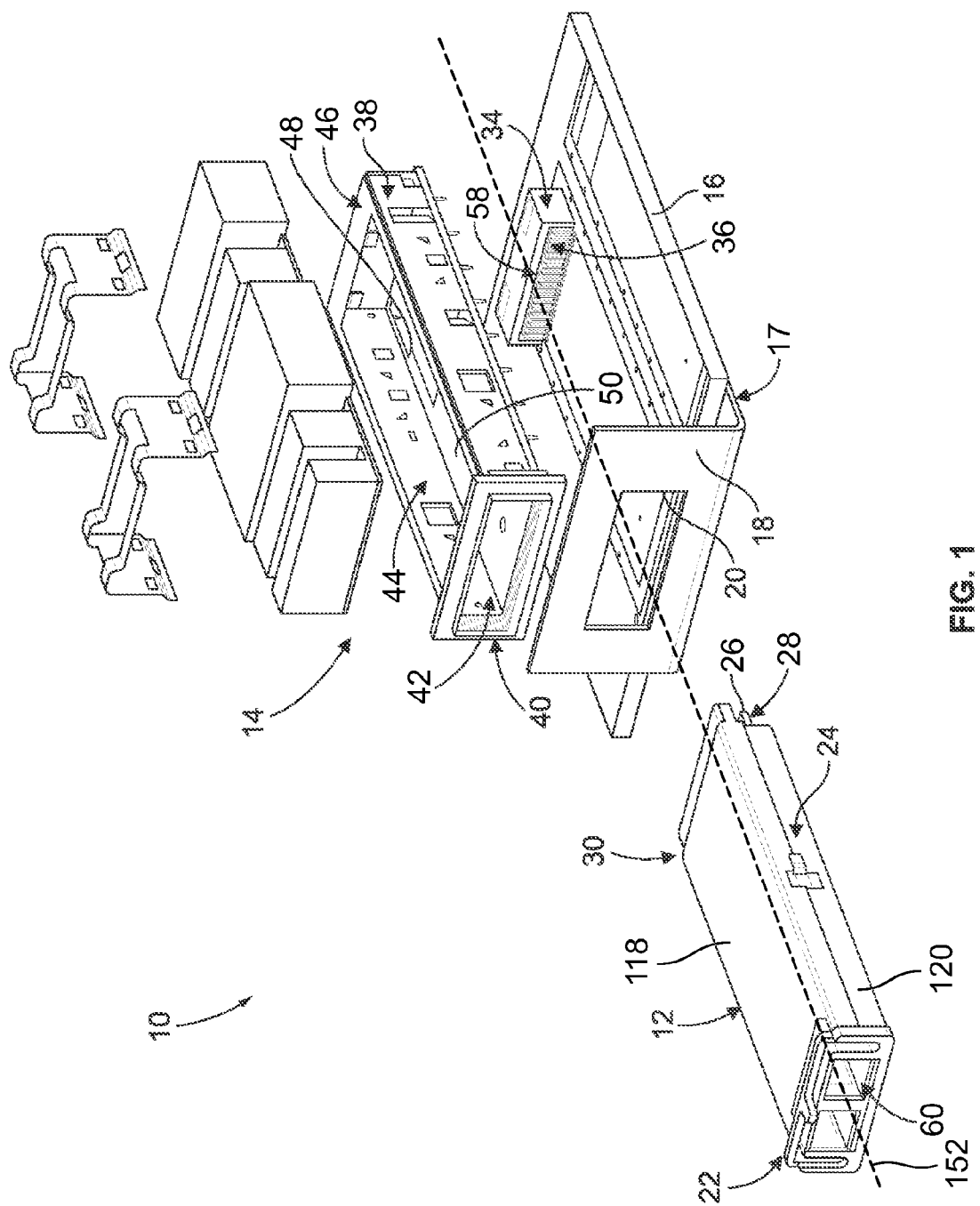
FIG. 1 is an exploded perspective view of an exemplary embodiment of a transceiver assembly.

FIG. 1 is a perspective view of a portion of an exemplary embodiment of a transceiver assembly 10. In the exemplary embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 28 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or any exemplary type of transceiver assembly shown and/or described herein.

The transceiver assembly 10 includes a pluggable module 12 configured for pluggable insertion into a receptacle assembly 14 that is mounted on a host circuit board 16. The host circuit board 16 may be mounted in a host system (not shown) such as, but not limited to, a router, a server, a computer, and/or the like. The host system typically includes a conductive chassis 17 having a panel 18 including an opening 20 extending therethrough in substantial alignment with the receptacle assembly 14. The receptacle assembly 14 is optionally electrically connected to the panel 18.

The pluggable module 12 is configured to be inserted into the receptacle assembly 14. Specifically, the pluggable module 12 is inserted into the receptacle assembly 14 through the panel opening 20 such that a front end 22 of the pluggable module 12 extends outwardly from the receptacle assembly 14. The pluggable module 12 includes a housing 24 that forms a protective shell for a circuit board 26 that is at least partially disposed within the housing 24. In an exemplary embodiment, the housing 24 includes upper and lower shells 118 and 120 that couple together to from the protective shell. The circuit board 26 carries circuitry, traces, paths, devices, and/or the like that perform transceiver functions in a known manner. An edge 28 of the circuit board 26 is exposed at a rear end 30 of the housing 24. In an exemplary embodiment, a straddle mount connector 32 (FIGS. 2-7) is mounted to the circuit board 26 and exposed through the rear end 30 of the housing 24 for plugging into a receptacle connector 34 of the receptacle assembly 14. The connector 32 is not shown in FIG. 1.

In general, the pluggable module 12 and the receptacle assembly 14 may be used in any application requiring an interface between a host system and electrical and/or optical signals. The pluggable module 12 interfaces to the host system through the receptacle assembly 14 via the receptacle connector 34 of the receptacle assembly 14, which is located within an electrically conductive cage 38 (which is sometimes referred to as a "receptacle guide frame" or a "guide frame"). As illustrated in FIG. 1, the cage 38 includes a front end 40 having a front opening, or port, 42 that is open to an internal compartment 44 of the cage 38. The receptacle connector 34 is positioned within the internal compartment 44 at a rear end 46 of the cage 38. The cage 38 includes an opening 48 extending through a lower wall 50 of the cage 38 for enabling the receptacle connector 34 to electrically connect to the host circuit board 16 from within the internal compartment 44. The internal compartment 44 of the cage 38 is configured to receive the pluggable module 12 therein in electrical connection with the receptacle connector 34.

The pluggable module 12 interfaces to one or more optical cables (not shown) and/or one or more electrical cables (not shown) through a connector interface 60 at the front end 22 of the module 12. Optionally, the connector interface 60 comprises a mechanism that cooperates with a fiber or cable assembly (not shown) to secure the fiber or cable assembly to the pluggable module 12. Suitable connector interfaces 60 are known and include adapters for the LC style fiber connectors and the MTP/MPO style fiber connectors offered by Tyco Electronics Corporation (Harrisburg, Pa.).

Figure 2:
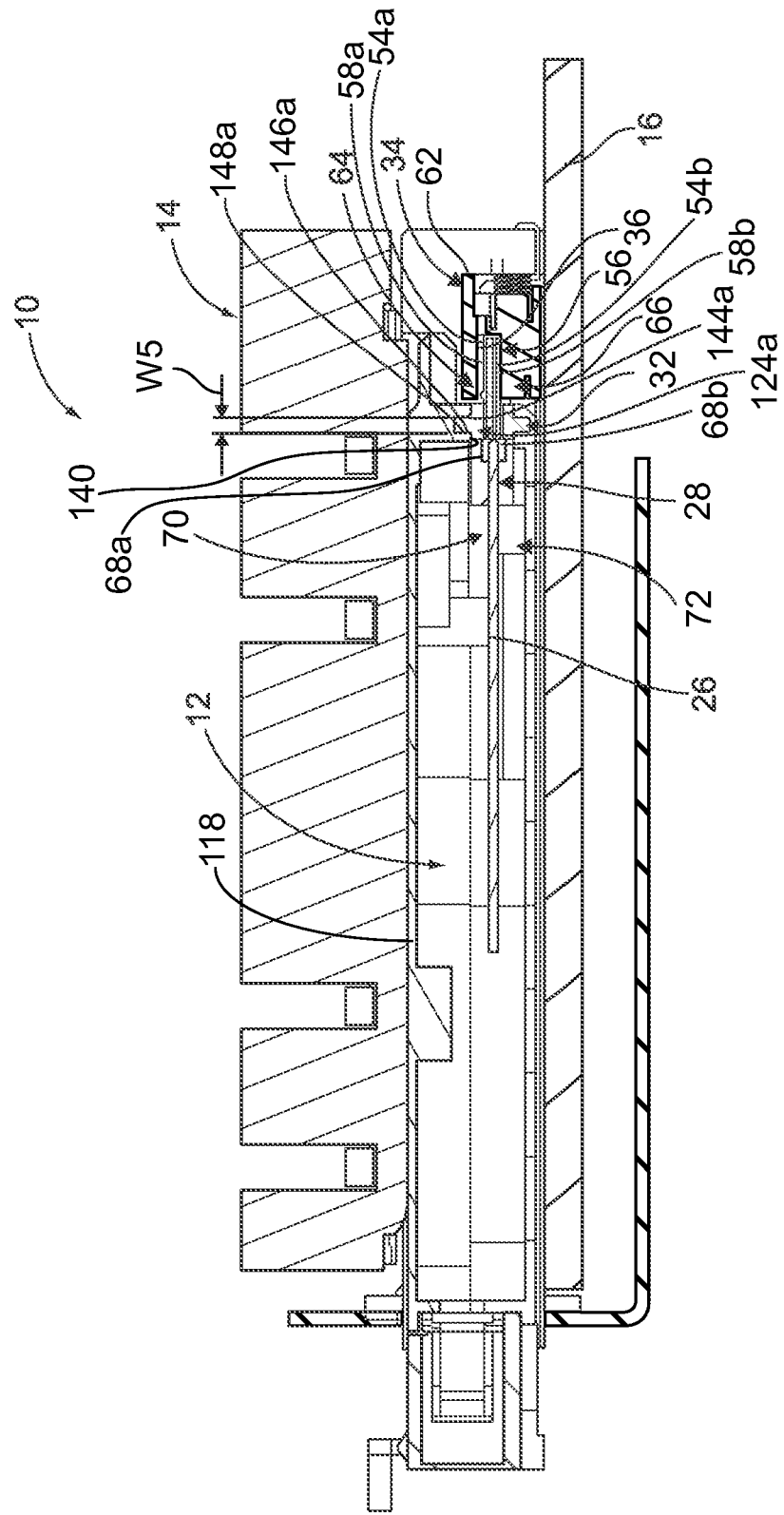
FIG. 2 is a cross-sectional view of the transceiver assembly shown in FIG. 1 illustrating an exemplary embodiment of a pluggable module mated with an exemplary embodiment of a receptacle assembly.

FIG. 2 is a cross-sectional view of the transceiver assembly 10 illustrating the pluggable module 12 mated with the receptacle assembly 14. The receptacle connector 34 is mounted on the host circuit board 16. The receptacle connector 34 includes a dielectric connector body 62 having the receptacle 36. The straddle mount connector 32 is mounted to the edge 28 of the circuit board 26 in electrically connection therewith.

The receptacle 36 of the receptacle connector 34 receives the plug 56 of the straddle mount connector 32 therein. Electrical contacts 58a of the receptacle connector 34 extend within the receptacle 36 and engage corresponding electrical contacts 54a on a side 64 of the plug 56. Electrical contacts 58b of the receptacle connector 34 extend within the receptacle 36 and engage corresponding electrical contacts 54b on a side 66 of the plug 56 that is opposite the side 64. The electrical contacts 54a and 54b of the plug 56 are electrically connected to corresponding electrically conductive contact pads 68a and 68b, respectively, on opposite sides 70 and 72 of the circuit board 26 to establish an electrical connection between the circuit board 26 and the host circuit board 16.

Figure 3:
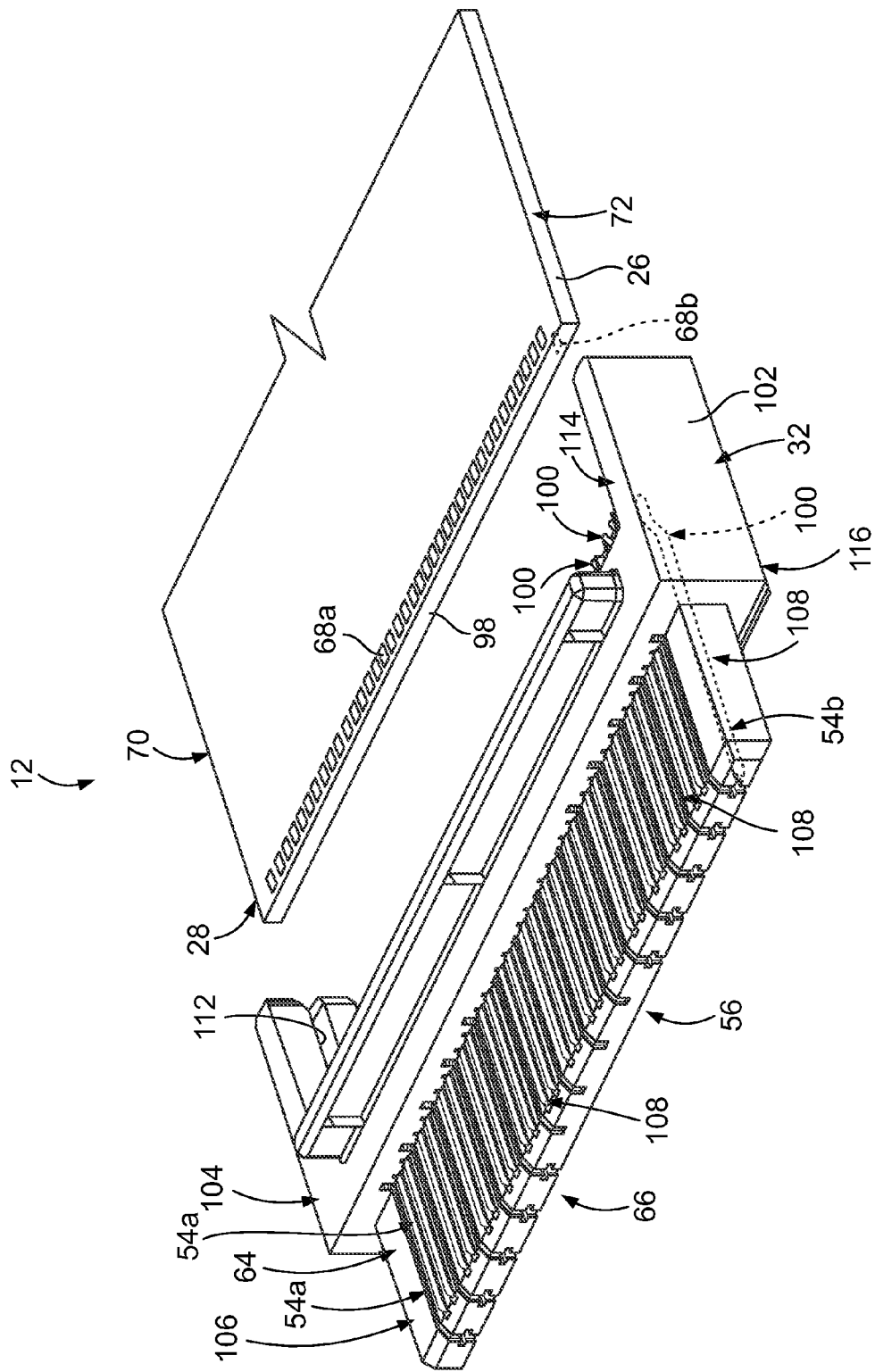
FIG. 3 is a partially exploded perspective view of a portion of the pluggable module shown in FIG. 2 illustrating an exemplary embodiment of a circuit board and an exemplary embodiment of a straddle mount connector for mounting to the circuit board.

FIG. 3 is a partially exploded view of a portion of the pluggable module 12 illustrating the circuit board 26 and the straddle mount connector 32. The circuit board 26 includes the opposite sides 70 and 72 and the edge 28. The edge 28 includes an edge surface 98 and portions of the sides 70 and 72 that extend proximate the edge surface 98. The contact pads 68a are arranged on the side 70 of the circuit board 26 along the edge 28. The contact pads 68b are arranged on the side 72 along the edge 28. The contact pads 68b are indicated with phantom lines in FIG. 3. Only one of the contact pads 68b is shown in FIG. 3 for clarity. Each of the contact pads 68a and 68b may be referred to herein as a "mating contact".

The circuit board 26 may include any number of the contact pads 68a and any number of the contact pads 68b. Each of the contact pads 68a and 68b may be a signal contact pad that is configured to conduct electrical data signals, a ground contact pad that is configured to be electrically connected to a ground, or a power contact that is configured to conduct electrical power. Optionally, some or all contact pads 68a and/or 68b used as signal contact pads may be arranged in pairs with each signal contact pad within a pair conveying a differential signal, thus defining one or more differential pairs. Within the arrangement of the contact pads 68a and 68b, one or more ground contact pads may be provided between adjacent differential pairs of signal contact pads. Any other contact arrangement of the contact pads 68a and 68b may be provided.

The straddle mount connector 32 is configured to be mounted to the edge 28 of the circuit board 26. The electrical contacts 54a and 54b of the straddle mount connector 32 include mounting segments 100 that engage corresponding ones of the contact pads 68a or 68b on the corresponding side 70 or 72, respectively, of the circuit board 26. The mounting segments 100 of the electrical contacts 54a and 54b straddle the edge 28 of the circuit board 26 therebetween. Optionally, the mounting segments 100 are soldered to the corresponding contact pads 68a and 68b. Other mounting means are possible in alternative embodiments.

The straddle mount connector 32 includes a dielectric connector body 102 having a base 104 and an extension 106 that extends outwardly on the base 104. The base 104 includes opposite sides 114 and 116. The extension 106 defines the plug 56 of the pluggable module 12. As described above, the plug 56 is configured to be received within the receptacle 36 (FIGS. 1 and 2) of the receptacle connector 34. In an exemplary embodiment, the base 104 receives a portion of the edge 28 of the circuit board 26 within slots 112 of the base 104 with an interference fit to securely couple the circuit board 26 to the base 104. However, the base 104 may be coupled to the edge 28 of the circuit board 26 using any other structure, means, connection type, and/or the like, such as, but not limited to, using a snap-fit connection, using a latch, a threaded or other fastener, an adhesive, and/or the like.

The electrical contacts 54a and 54b of the straddle mount connector 32 are held by the connector body 102. The electrical contacts 54a and 54b may include signal contacts that are configured to conduct electrical data signals, ground contacts that are configured to be electrically connected to a ground, and/or power contacts that are configured to conduct electrical power. The straddle mount connector 32 may include any number of the electrical contacts 54a and any number of the electrical contacts 54b. Optionally, some or all electrical contacts 54a and/or 54b used as signal contacts may be arranged in pairs with each signal contact within a pair conveying a differential signal, thus defining one or more differential pairs. Within the arrangement of the electrical contacts 54a and 54b, one or more ground contacts may be provided between adjacent differential pairs of signal contacts. Any other contact arrangement of the electrical contacts 54a and 54b may be provided.

The electrical contacts 54a and 54b of the straddle mount connector 32 include mating segments 108 at which the electrical contacts 54a and 54b engage the corresponding electrical contacts 58a and 58b (FIG. 2), respectively, of the receptacle connector 34. Engagement between the mating segments 108 of the electrical contacts 54a and 54b and the corresponding electrical contacts 58a and 58b, respectively, establishes an electrical connection between the connectors 32 and 34. The electrical contacts 54b are indicated with phantom lines in FIG. 3. Only one of the electrical contacts 54b is shown in FIG. 3 for clarity.

Figure 4:
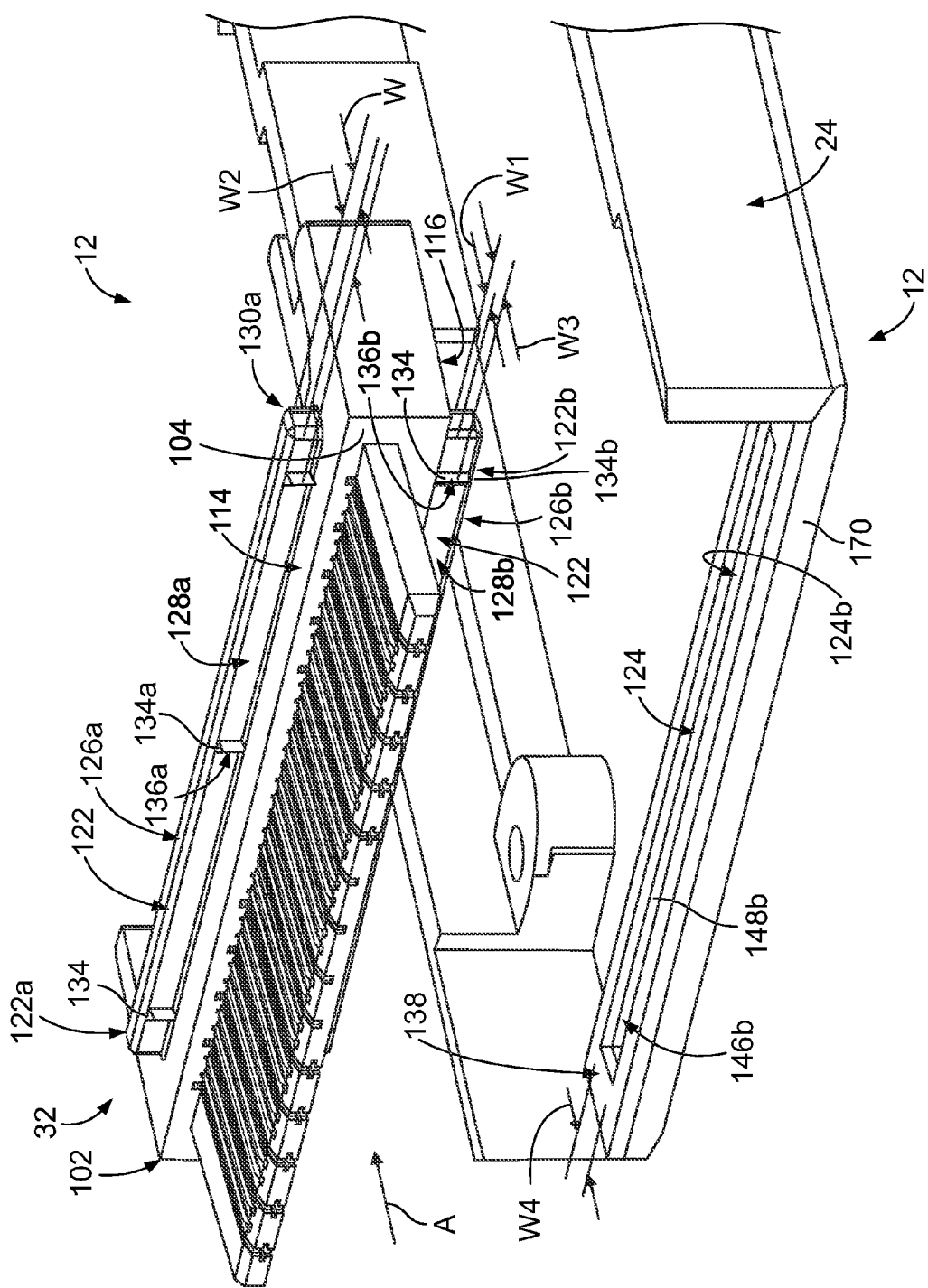
FIG. 4 is a partially exploded perspective view of the straddle mount connector shown in FIG. 3 and another portion of the pluggable module shown in FIG. 2.
Figure 5:
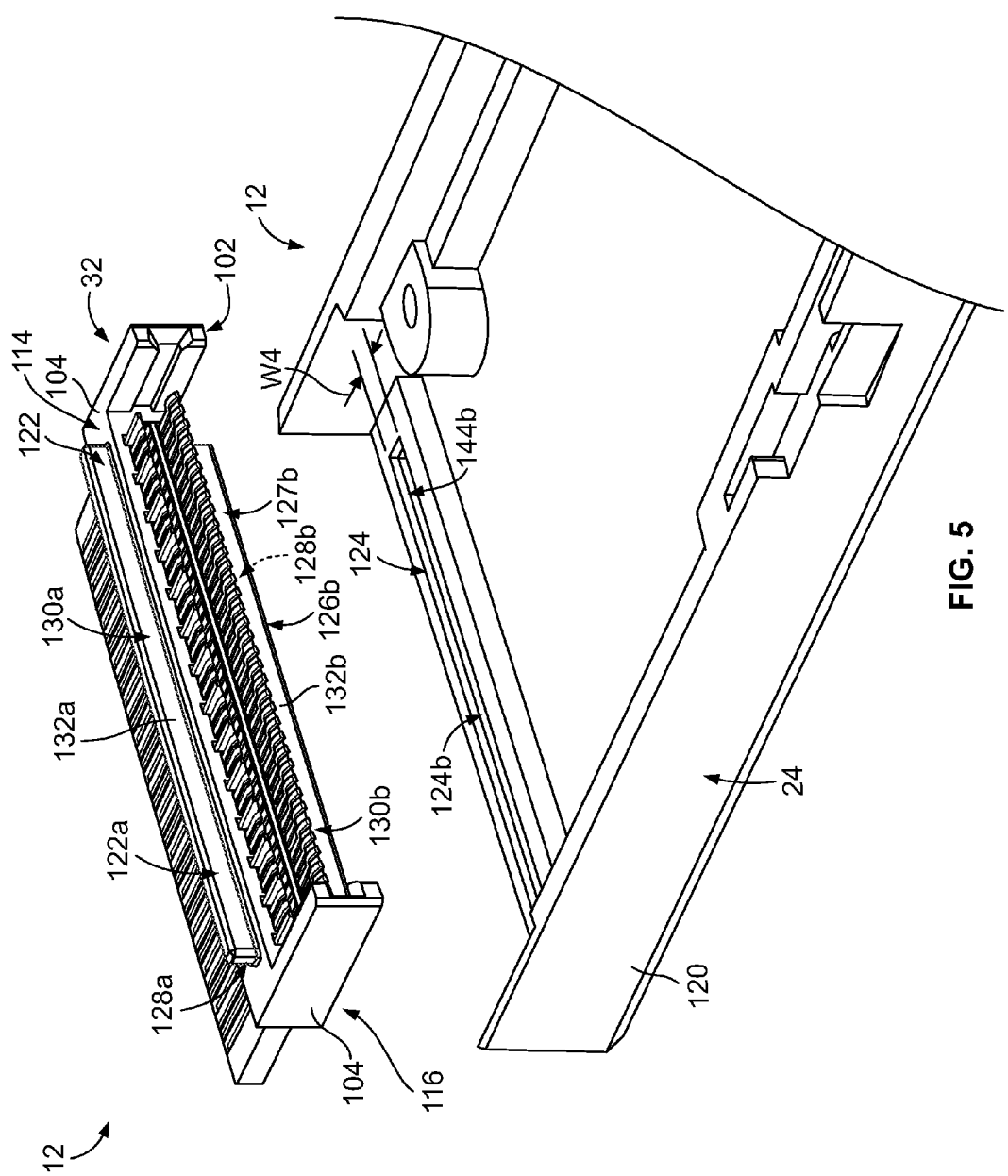
FIG. 5 is another partially exploded perspective view of the straddle mount connector shown in FIG. 4 and the portion of the pluggable module shown in FIG. 4 viewed from a different angle than FIG. 4.

FIG. 4 is a partially exploded perspective view of the straddle mount connector 32 and another portion of the pluggable module 12. FIG. 5 is another partially exploded perspective view of the straddle mount connector 32 and the portion of the pluggable module shown in FIG. 4 viewed from a different angle than FIG. 4. FIGS. 4 and 5 illustrate the lower shell 120 of the housing 24 of the pluggable module 12. Referring now to FIGS. 4 and 5, the connector body 102 includes one or more locating bosses 122 that extend from the base 104. In an exemplary embodiment, a locating boss 122a extends outwardly on the side 114 of the base 104, while a locating boss 122b extends outwardly on the opposite side 116 of the base 104. The locating bosses 122 cooperate with the housing 24 of the pluggable module 12 to secure the straddle mount connector 32 to the housing 24. More specifically, the locating bosses 122 are received within corresponding locating openings 124 of the housing 24 of the pluggable module 12, as will be described in more detail below.

The locating bosses 122a extend outwardly on the respective sides 114 and 116 of the base 104 to respective ends 126a and 126b. The locating boss 122a includes opposite sides 128a and 130a, while locating boss 122b includes opposite sides 128b and 130b. The sides 128a and 128b are best seen in FIG. 4 and generally face toward the plug 56 of the connector 32. The sides 130a and 130b are best seen in FIG. 5 and generally face away from the plug 56. The side 130b is not labeled in FIG. 4. The sides 130a and 130b of the respective locating bosses 122a and 122b include datum surfaces 132a and 132b, respectively. The datum surfaces 132a and 132b are not labeled in FIG. 4. As shown in FIG. 4, the locating boss 122a extends a width W defined from the side 128a to the side 130a. Similarly, the locating boss 122b extends a width $W_1$ defined from the side 128b to the side 130b. Each of the sides 128a and 128b may be referred to herein as a "rib side" and/or a "datum side", while each of the sides 130a and 130b may be referred to as a "rib side" and/or a "datum side".

Although two are shown and described herein, the connector body 102 may include any number of locating bosses 122. Moreover, each side 114 and 116 of the base 104 may include any number of locating bosses 122 extending thereon. In some embodiments, the connector body 102 does not include any locating bosses 122 on the side 114 or on the side 116. In an exemplary embodiment, each of the locating bosses 122a and 122b generally includes the shape of a parallelepiped. But, each locating boss 122a and 122b additionally or alternatively may include any other shape, which may depend on the shape of the corresponding locating opening 124. In some embodiments, the locating boss 122a includes a different shape than the locating boss 122b.

Referring now solely to FIG. 4, one or more of the locatinb bosses 122 includes one or more crush ribs 134 that extend outwardly from the locating boss 122. In an exemplary embodiment, three crush ribs 134a extend outwardly on the side 128a of the locating boss 122a. The crush ribs 134a extend outwardly to ends 136a. The locating boss 122b includes three crush ribs 134b that extend outwardly on the side 128b in the exemplary embodiment. Only one of the crush ribs 134b is visible in FIG. 4. The crush ribs 134b extend outwardly to ends 136b. Each of the crush ribs 134a and 134b extends outwardly on the respective locating boss 122a and 122b in a direction generally away from the datum surface 132a and 132a of the respective locating boss 122a and 122b.

The crush ribs 134 are configured to deform as the locating bosses 122 are received within the locating openings 124. As will be described in more detail below, deformation of the locating bosses 122 facilitates securing the straddle mount connector 32 to the housing 24 of the pluggable module 12 such that the connector 32 does not move, or float, relative to the housing 24. In an exemplary embodiment, the crush ribs 134 are each configured to deform by at least partially collapsing. The crush ribs 134 at least partially collapse in a direction indicated by the arrow A in FIG. 4. Each of the crush ribs 134 may collapse by any amount. The amount that each crush rib 134 is configured to collapse may be selected to exert a predetermined alignment force on the housing 24 of the pluggable module 12, as will be described below.

FIG. 4 illustrates the crush ribs 134 in an undeformed state. In other words, FIG. 4 illustrates the crush ribs 134 before the crush ribs 134 have collapsed. When the crush ribs 134a and 134b are in the undeformed state shown in FIG. 4, the locating boss 122a extends a width $W_2$ from the side 130a of the locating boss 122a to the ends 136a of the crush ribs 134a. The locating boss 122b extends a width $W_3$ from the side 130b of the locating boss 122b to the ends 136b of the crush ribs 134b when the crush ribs 134b are in the undeformed state.

In an exemplary embodiment, each of the crush ribs 134 includes a triangular cross-sectional shape in the undeformed state, as should be apparent from FIG. 4. But, each crush rib 134 additionally or alternatively may include any other shape in the undeformed state. The shape of a crush rib 134 in the undeformed state may be selected to exert a predetermined alignment force on the housing 24 of the pluggable module 12 as the crush rib 134 deforms, as will be described below.

The connector body 102 may include any number of the crush ribs 134. Each locating boss 122 may include any number of the crush ribs 134. In an exemplary embodiment, the sides 130a and 130b do not include any crush ribs 134. But, the sides 130a and/or 130b may each include one or more of the crush ribs 134 in addition or alternatively to any of the crush ribs 134 on the sides 128a and/or 128b. Each side 128a, 128b, 130a, and 130b may include any number of the crush ribs 134. In an exemplary embodiment, the shapes, locations on the locating boss 122b, and number of the crush ribs 134b is substantially the same as the shapes, locations on the locating boss 122a, and number, respectively, of the crush ribs 134a. But, in some alternative embodiments, the crush ribs 134b may have different shapes, locations on the locating boss 122b, and number as compared to the shapes, locations on the locating boss 122a, and number, respectively, of the crush ribs 134a.

Referring again to FIGS. 4 and 5, and as briefly described above, the housing 24 of the pluggable module 12 includes the locating openings 124 that receive the locating bosses 122 therein. In an exemplary embodiment, a locating opening 124b extends into an interior side 138 of the lower shell 120 of the housing 24, while a locating opening 124a (FIG. 2) extends into an interior side 140 (FIG. 2) of the upper shell 118.

The locating opening 124b extends into the interior side 138 of the lower shell 120 to a bottom wall (not shown). Opposite walls 144b and 146b partially define the locating opening 124b. The wall 144b is best seen in FIG. 5, while the wall 146b is best seen in FIG. 4. The wall 146b includes a datum surface 148b. The locating opening 124b extends a width $W_4$ defined from the wall 144b to the wall 146b. As will be described below, the width $W_4$ is less than the width $W_3$ of the locating boss 122b.

Referring again to FIG. 2, the locating opening 124a extends into the interior side 140 of the upper shell 118 to a bottom wall (not labeled). The locating opening 124a is partially defined by opposite walls 144a and 146a. The wall 146 includes a datum surface 148a. The locating opening 124a extends a width $W_5$ defined from the wall 144a to the wall 146a. The width $W_5$ is less than the width $W_2$ of the locating boss 122a.

Although two are shown and described herein, the housing 24 of the pluggable module 12 may include any number of locating openings 124. Moreover, each shell 118 and 120 of the housing 24 may include any number of locating openings 124. In some embodiments, the housing 24 does not include any locating openings 124 in the shell 118 or the shell 120. In an exemplary embodiment, each of the locating openings 124a and 124b generally includes the shape of a parallelepiped. But, each locating opening 124a and 124b additionally or alternatively may include any other shape, which may depend on the shape of the respective locating boss 122a and 122b. In some embodiments, the locating opening 124a includes a different shape than the locating opening 124b.

Figure 6:
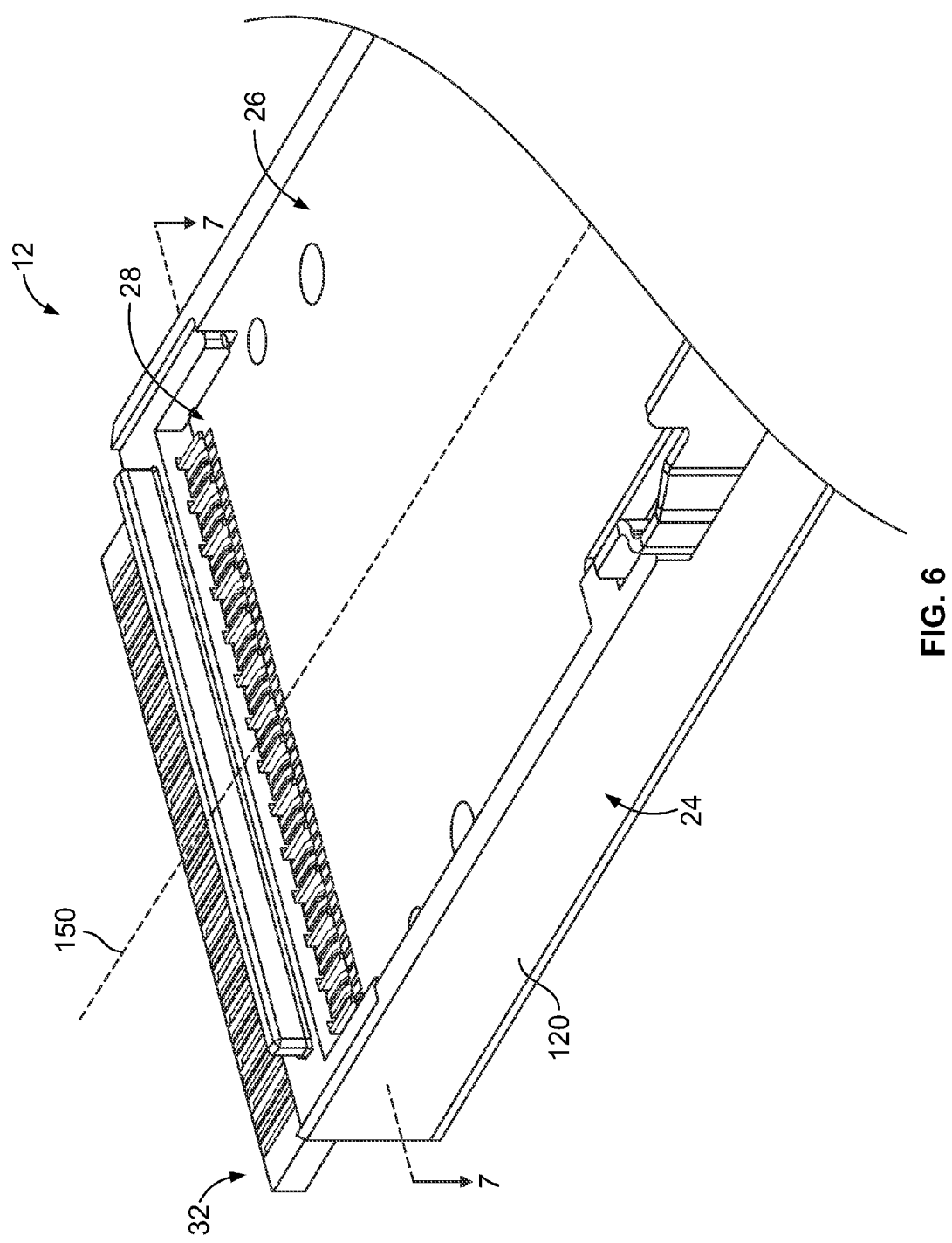
FIG. 6 is an unexploded perspective view of the straddle mount connector and the portion of the pluggable module shown in FIGS. 4 and 5.

FIG. 6 is a perspective view of the straddle mount connector 32 and the portion of the pluggable module 12 shown in FIGS. 4 and 5. FIG. 6 illustrates the straddle mount connector 32 secured to the lower shell 120 of the pluggable module housing 24. More specifically, the locating boss 122b (FIGS. 4, 5, and 7) is received within the locating opening 124b (FIGS. 4, 5, and 7). FIG. 6 also illustrates the straddle mount connector 32 mounted to the edge 28 of the circuit board 26 of the pluggable module 12. As can be seen in FIG. 6, the connector 32 is mounted to the circuit board 26 along a mounting axis 150.

FIG. 7 is a cross-sectional view taken along line 7-7 of FIG. 6. FIG. 7 illustrates the locating boss 122b received within the locating opening 124b. FIG. 7 illustrates the crush ribs 134b in a deformed state. The crush ribs 134b are deformed and engaged with the wall 144b of the locating opening 124b of the housing 24. More specifically, as the locating boss 122b is inserted into the locating opening 124b, the crush ribs 134b engage the wall 144b of the locating opening 124b. As described above, the width $W_4$ (FIG. 4) of the locating opening 124b is less than the width $W_3$ (including the crush ribs 134b; shown in FIG. 4) of the locating boss 122b. Accordingly, the crush ribs 134b deform as the locating boss 122b is received into the locating opening 124b. More specifically, the crush ribs 134b at least partially collapse in the direction of the arrow A, which is approximately parallel to the circuit board 26 (FIGS. 1, 2, and 6) and approximately parallel to the mounting axis 150. As can be seen in FIG. 7, when deformed in an exemplary embodiment, the ends 136b of the crush ribs 134b have collapsed such that the crush ribs 134b have a rectangular cross-sectional shape instead of the triangular cross-sectional shape of the undeformed state. But, each crush rib 134b additionally or alternatively may include any other shape in the deformed state.

As and once the crush ribs 134b have at least partially collapsed, the crush ribs 134b exert an alignment force on the wall 144b of the housing 24. The alignment force acts on the wall 144b in a direction B that is opposite the direction A of the collapse. The alignment force exerted on the housing 24 aligns the datum surface 132b of the locating boss 122b with the datum surface 148b of the locating opening 124b. In other words, the datum surfaces 132b and 148b are engaged with each other. The deformation of the crush ribs 134b creates an interference fit between the locating boss 122b and the locating opening 124b. More specifically, the alignment force exerted by the crush ribs 134b on the wall 144b and the engagement between the datum surfaces 132b and 148b creates the interference fit between the boss 122b and the opening 124b. The interference fit between the locating boss 122b and the locating opening 124 secures the straddle mount connector 32 to the housing 24 such that the connector 32 does not move, or float, relative to the housing 24 along an insertion axis 152 (also shown in FIG. 1) when the connector 32 is inserted into the receptacle 36 (FIGS. 1 and 2) of the receptacle connector 34 (FIGS. 1 and 2).

The crush ribs 134b may at least partially collapse in any other direction than the direction B that enables the crush ribs 134b to generate the interference fit between the locating boss 122b and the locating opening 124b. The amount that each crush rib 134b is configured to collapse, the shape of each crush rib 134b (whether in the undeformed state or the deformed state), and/or the like may be selected to exert a predetermined alignment force on the housing 24 of the pluggable module 12. The amount that each crush rib 134b is configured to collapse, the shape of each crush rib 134b (whether in the undeformed state or the deformed state), and/or the like may be selected to provide the interference fit between the boss 122b and the opening 124b with a predetermined amount of interference.

In some alternative embodiments, the locating boss 122b includes one or more crush ribs 134b on the side 130b instead of the side 128b for aligning a datum surface (not shown) of the side 128b with a datum surface (not shown) of the side 144b of the locating opening 124b and for generating the interference fit. Moreover, in other alternative embodiments, the locating boss 122b includes crush ribs 134b on both of the sides 128b and 130b for generating the interference fit between the locating boss 122b and the locating opening 124b. In such alternative embodiments wherein the locating boss 122b includes crush ribs 134b on both of the sides 128b and 130b, the datum surface 132b may not engage the datum surface 148b.

The cooperation between the locating boss 122a and the locating opening 124a to secure the connector 32 to the housing 24 such that the connector 32 does not move, or float, relative to the housing 24 along the insertion axis 152 is substantially similar to that described above with respect to the cooperation between the locating boss 122b and the locating opening 124b. Accordingly, the cooperation between the locating boss 122a and the locating opening 124a will not be described or illustrated in more detail herein.

The embodiments described and/or illustrated herein may provide a connector that is secured to the housing of a pluggable module such that the connector does not move, or float, relative to the housing along an insertion axis when the connector is inserted into a receptacle connector. The embodiments described and/or illustrated herein may provide a connector having electrical contacts that experience a sufficient amount of contact wipe with corresponding electrical contacts of a receptacle connector to with which the connector is mated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A pluggable module comprising:
a housing having a locating opening, the locating opening being at least partially defined by a wall of the housing, the locating opening comprising a datum surface;
a circuit board at least partially disposed within the housing, the circuit board having an edge and a mating contact; and
an electrical connector mounted to the circuit board, the electrical connector comprising:
an electrical contact having a mounting segment that is configured to be electrically connected to the mating contact of the circuit board; and
a dielectric connector body, the electrical contact being held by the body, the body having a base that is coupled to the edge of the circuit board, the body comprising a locating boss that extends outwardly on the base, the locating boss being received within the locating opening of the housing, wherein the locating boss comprises a datum surface and a crush rib that extends outwardly from the locating boss, the crush rib being deformed and engaged with the wall of the housing such that the crush rib exerts an alignment force on the housing that presses the datum surface of the locating boss against the datum surface of the locating opening of the housing.

2. The pluggable module of claim 1, wherein the deformation of the crush rib creates an interference fit between the locating boss and the locating opening.

3. The pluggable module of claim 1, wherein the locating boss comprises a rib side and a datum side that is opposite the rib side, the crush rib extending outwardly on the rib side of the locating boss, the datum side comprising the datum surface of the locating boss.

4. The pluggable module of claim 1, wherein the crush rib is deformed via engagement with the wall of the housing.

5. The pluggable module of claim 1, wherein the crush rib has deformed by at least partially collapsing in a direction that is approximately parallel to the circuit board.

6. The pluggable module of claim 1, wherein the electrical connector is mounted to the circuit board along a mounting axis, the crush rib having deformed by at least partially collapsing in a direction that is approximately parallel to the mounting axis.

7. The pluggable module of claim 1, wherein the crush rib extends outwardly on the locating boss in a direction generally away from the datum surface of the locating boss.

8. The pluggable module of claim 1, wherein a width of the locating opening is less than a width of the locating boss that includes the crush rib.

9. The pluggable module of claim 1, wherein the electrical connector is a straddle mount connector that is straddle mounted to the edge of the circuit board.

10. An electrical connector for mounting to a circuit board of a pluggable module, the electrical connector comprising:
an electrical contact having a mounting segment that is configured to be electrically connected to a mating contact of the circuit board; and
a dielectric connector body, the electrical contact being held by the body, the body having a base that is configured to be coupled to an edge of the circuit board, the body comprising a locating boss that extends outwardly on the base, the locating boss being configured to be received within a locating opening of a housing of the pluggable module, wherein the locating boss comprises a datum surface and a crush rib that extends outwardly from the locating boss, the crush rib being deformable such that the crush rib is configured to deform when engaged with the housing of the pluggable module and thereby exert an alignment force on the housing that presses the datum surface of the locating boss against a datum surface of the locating opening of the housing.

11. The electrical connector of claim 10, wherein the locating boss comprises a rib side and a datum side that is opposite the rib side, the crush rib extending outwardly on the rib side of the locating boss, the datum side comprising the datum surface of the locating boss.

12. The electrical connector of claim 10, wherein the crush rib is configured to deform via engagement with a wall of the pluggable module housing that defines at least a portion of the locating opening.

13. The electrical connector of claim 10, wherein the crush rib is configured to deform by at least partially collapsing in a direction that is approximately parallel to the circuit board of the pluggable module.

14. The electrical connector of claim 10, wherein the electrical connector is configured to be mounted to the circuit board along a mounting axis, the crush rib being configured to deform by at least partially collapsing in a direction that is approximately parallel to the mounting axis.

15. The electrical connector of claim 10, wherein the crush rib extends outwardly on the locating boss in a direction generally away from the datum surface of the locating opening of the pluggable module housing.

16. The electrical connector of claim 10, wherein the a width of the locating opening is less than a width of the locating boss that includes the crush rib.

17. The electrical connector of claim 10, wherein the electrical connector is a straddle mount connector that is configured to be straddle mounted to the edge of the circuit board of the pluggable module.

* * * * *